US010764851B2

(12) United States Patent
Kerhuel et al.

(10) Patent No.: US 10,764,851 B2
(45) Date of Patent: Sep. 1, 2020

(54) EARLY DETECTION OF SSB INDEX USING PRIORITIZED CANDIDATE SSB INDEX ORDERING

(71) Applicant: NXP USA, INC., Austin, TX (US)

(72) Inventors: Samuel Kerhuel, Villeneuve Tolosane (FR); Radu Pralea, Bucharest (RO); Andrei Lucian Ariseanu, Ploiesti (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/278,220

(22) Filed: Feb. 18, 2019

(65) Prior Publication Data

US 2020/0196254 A1    Jun. 18, 2020

(30) Foreign Application Priority Data

Dec. 13, 2018  (RO) ................................ 2018-01106

(51) Int. Cl.
| | | |
|---|---|---|
| H04W 72/00 | (2009.01) | |
| H04W 56/00 | (2009.01) | |
| H04W 74/08 | (2009.01) | |
| H04L 27/18 | (2006.01) | |
| H04L 5/00 | (2006.01) | |
| H04L 29/08 | (2006.01) | |

(52) U.S. Cl.
CPC ......... *H04W 56/001* (2013.01); *H04L 5/0048* (2013.01); *H04L 27/18* (2013.01); *H04W 72/005* (2013.01); *H04W 74/0833* (2013.01); *H04L 69/324* (2013.01)

(58) Field of Classification Search
None
See application file for complete search history.

(56) References Cited

U.S. PATENT DOCUMENTS

| 10,277,349 B1* | 4/2019 | Kotecha ............... H04J 11/0086 |
| 10,425,969 B2* | 9/2019 | Åstrom et al. .... H04W 72/0413 |
| 2015/0341908 A1 | 11/2015 | Wang et al. |
| 2018/0084593 A1 | 3/2018 | Chen et al. |

(Continued)

FOREIGN PATENT DOCUMENTS

| KR | 20170128107 A | 11/2017 |
| WO | 2018048091 A1 | 3/2018 |

OTHER PUBLICATIONS

Giordani, Marco et al., "A Tutorial on Beam Management for 3GPP NR at mmWave Frequencies," IEEE Communications Surveys & Tutorials, Apr. 5, 2018; 22 pages.

(Continued)

*Primary Examiner* — Fahmida S Chowdhury

(57) ABSTRACT

A wireless network includes a base station and a user equipment. The base station is configured to wirelessly transmit radio frequency (RF) signaling representing synchronization signal block (SSB) burst comprising a set of SSBs, each SSB associated with a different beam transmitted by the base station and having a corresponding index value representing a position of the SSB in the SSB burst. The user equipment is configured to detect an SSB of the SSB burst and to identify an index value of the SSB by iteratively performing a decoding process for a physical broadcast channel (PBCH) of the SSB, each performed iteration using a different index values selected from a prioritized ordering of the set of index values.

17 Claims, 8 Drawing Sheets

(56) References Cited

U.S. PATENT DOCUMENTS

| | | | |
|---|---|---|---|
| 2018/0279364 A1* | 9/2018 | Hui | H04W 74/0833 |
| 2018/0302819 A1* | 10/2018 | Lee | H04B 7/0626 |
| 2019/0045559 A1* | 2/2019 | Huang | H04W 24/10 |
| 2019/0053271 A1* | 2/2019 | Islam | H04W 36/0066 |
| 2019/0053321 A1* | 2/2019 | Islam | H04B 7/0639 |
| 2019/0110300 A1* | 4/2019 | Chen | H04W 74/04 |

OTHER PUBLICATIONS

Kamath, H. et al., "Decoding of PBCH in LTE," International Journal of Computer Applications (0975-8887), vol. 106, No. 12; Nov. 2014; 5 pages.

\* cited by examiner

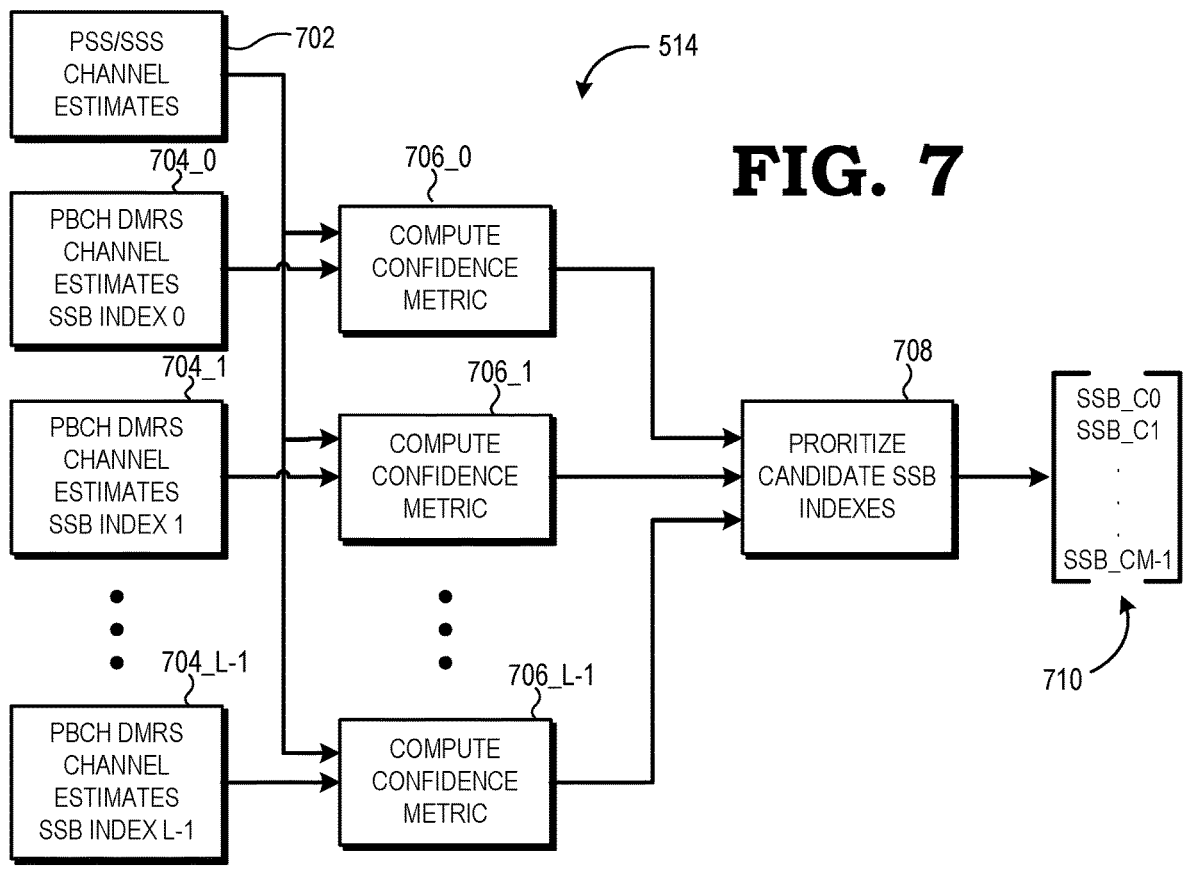
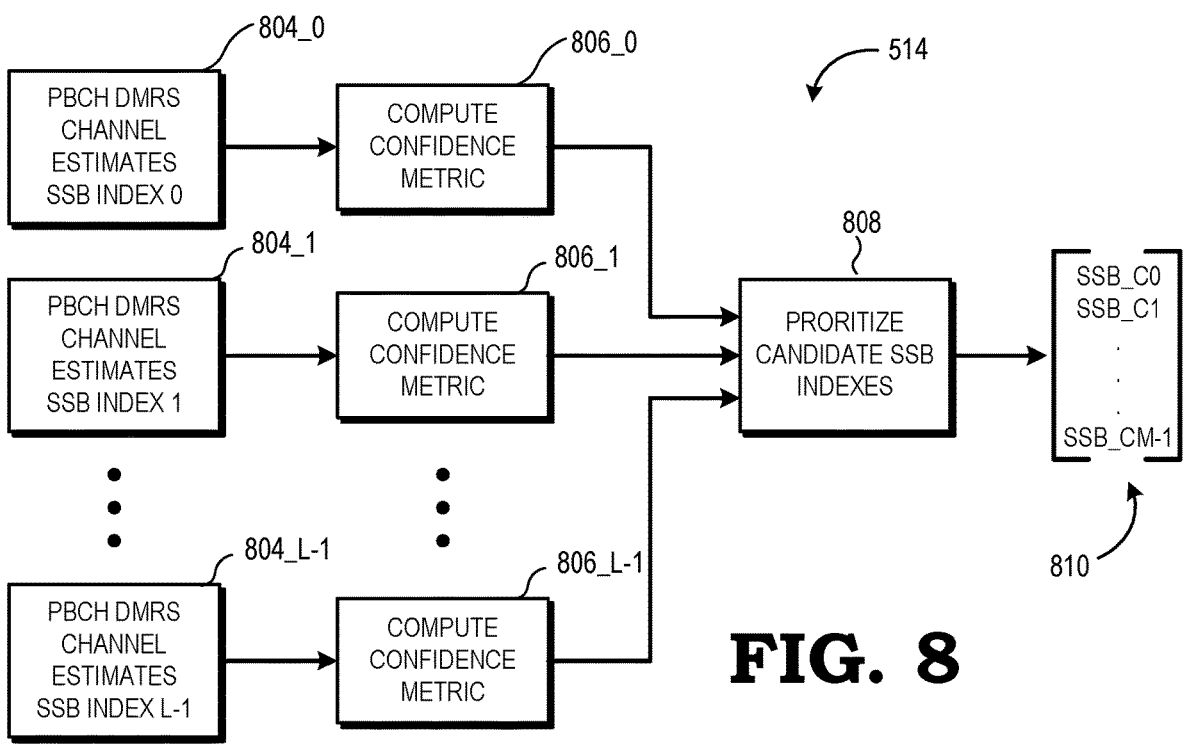

EARLY DETECTION OF SSB INDEX USING PRIORITIZED CANDIDATE SSB INDEX ORDERING

CROSS-REFERENCE TO RELATED APPLICATION

The present application claims priority to Romanian Application No. A 2018/01106, entitled "EARLY DETECTION OF SSB INDEX USING PRIORITIZED CANDIDATE SSB INDEX ORDERING", and filed on Dec. 13, 2018, the entirety of which is incorporated by reference herein.

BACKGROUND

In a packet-switched wireless network based on Fifth Generation (5G) New Radio (NR) protocols or other similar protocols, the initial access between a user equipment (UE) and a base station (e.g., next generation nodeB or gNB) is facilitated by the base station's transmission of a Synchronization Signal Block (SSB) that represents two physical signals: a Primary Synchronization Signal (PSS) and a Secondary Synchronization Signal (SSS); as well as one physical channel: the Physical Broadcast Channel (PBCH). The PBCH carries a Master Information Block (MIB), which represents the minimum parameters necessary for the UE to wirelessly connect to the base station.

In many implementations, the base station may use an antenna array to facilitate beamformed transmission of the synchronization signaling such that the base station sweeps its corresponding cell volume with multiple beams of the synchronization signaling directed in different spatial directions in a time-multiplexed manner. In this approach, the base station periodically transmits an SSB burst set composed of one or more SSB bursts. Each SSB burst includes an SSB for each beam employed by the base station, and whereby each SSB within an SSB burst is identified by an index value, referred to as an SSB index, that represents the position of the SSB within the SSB burst. The SSB index for a given SSB within the SSB burst is used to generate the SSB itself, including its use in encoding the DeModulation Reference Signal (DMRS) used as a reference signal for decoding a Physical Broadcast Channel (PBCH) of the SSB.

However, while the SSB index of an SSB is needed to process the SSB itself, an SSB does not explicitly identify its associated SSB index. As such, the UE conventionally is required to determine the SSB index by iterating through all possible values of the SSB index during end-to-end decoding of the PBCH of a received SSB and then identifying the SSB index of the SSB as the particular SSB index value that provided the correct decoding result. This brute-force approach often unnecessarily consumes excessive computing resources and bandwidth.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 7 is a diagram illustrating a method for SSB index candidate prioritization in accordance with some embodiments.

FIG. 8 is a diagram illustrating another method for SSB index candidate prioritization in accordance with some embodiments.

DETAILED DESCRIPTION

As the Synchronization Signal Block (SSB) index for an SSB is used in two places in the Fifth Generation (5G) New Radio (NR) physical layer (that is, computing the seed value for the pseudo-random sequence of the Physical Downlink Channel (PDCH) DeModulation Reference Signal (DMRS) and for use in Physical Broadcast Channel (PBCH) scrambling), the conventional approach to determining the SSB index is iteratively run through the full process of PBCH decoding starting at the SSB index of 0 until the correct PBCH decoding is obtained. This approach requires, on average, a substantial number of iterations and thus consumes considerable time, bandwidth, and power of the user equipment (UE).

Described herein are systems and techniques for early SSB index detection so as to reduce the time and effort otherwise required to determine the SSB index of an SSB of interest. In at least one embodiment, the UE is configured to prioritize the candidate SSB index values to generate a prioritized ordering or list of candidate SSB index values. One or more iterations of a decoding process for a physical broadcast channel (PBCH) of the SSB are performed using a different candidate SSB index value for each iteration selected from this prioritized SSB index list in the prioritized ordering until a valid decoding result is found. The candidate SSB index value used in the valid PBCH decoding is then identified by the UE as the actual SSB index of the SSB, and the UE thus can continue operation using the SSB and its identified index number, such as by decoding the System Information Block—Type 1 (SIB1) over PDDCH to obtain the Physical Random Access Channel (PRACH) parameters and then performing a Random Access process to connect to the base station by transmitting a Random Access Channel (RACH) to the base station using resources (e.g., resource blocks) that are associated with the identified SSB index. By using a prioritized ordering of the possible SSB index values during this iterative PBCH decoding process, the UE can more efficiently identify the actual SSB index for the SSB compared to conventional brute force iterative approaches.

For ease of reference, the early SSB index detection techniques are described herein in the example context of a 5G NR protocol employing beamforming and a corresponding SSB burst set configuration without explicit full SSB index identification. However, these techniques may be employed in wireless networks utilizing a protocol other than a 5G NR protocol for early SSB index detection using the principles and guidelines described herein. Thus, reference to the 5G NR protocol and corresponding terms applies equally to such similar protocols unless otherwise noted.

Figure 1:
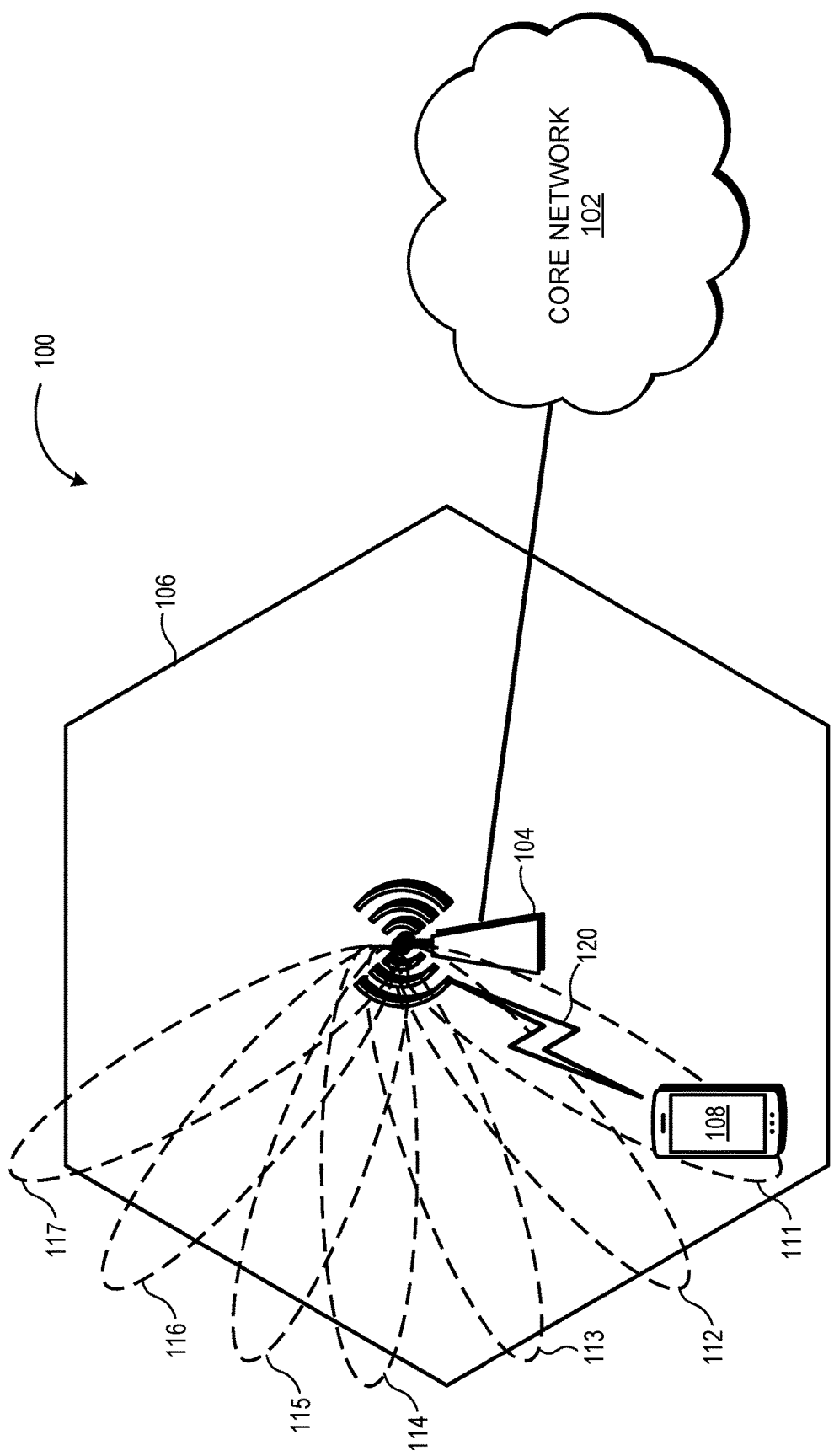
FIG. 1 is a block diagram of a wireless network employing early SSB index detection in accordance with some embodiments.

FIG. 1 illustrates a wireless network 100 implementing early SSB index detection in accordance with at least one embodiment. The wireless network 100 includes a core network 102 communicatively coupled to a plurality of base stations representing a corresponding cell, such as a base station 104 representing a corresponding cell 106. For purposes of illustration, the wireless network 100 is compatible with a 5G NR protocol, and thus the base station 104 is also referred to herein as a next generation NodeB (gNB). Each base station operates to establish uplink and downlink communication channels with any user equipment (UE), such as UE 108, present in the general area of the corresponding cell. The UE can include any of a variety of wireless-enabled devices, including cell phones, tablet computers, notebook computers, desktop computers, gaming consoles, smartwatches and other wireless-enabled wearable devices, televisions, wireless- and compute-enabled appliances, and the like.

To facilitate improved signal reception and throughput speeds, in at least one embodiment the base station 104 utilizes beamforming for the transmission of synchronization signaling as well as for the transmission and reception of data signaling. To this end, the base station 104 employs an antenna array (not shown) to sweep the general area of the cell 106 via a set of directed signaling beams, such as directed beams 111, 112, 113, 114, 115, 116, 117 (collectively, "beams 111-117"), with each beam having a different spatial direction relative to the position of the base station 104. The UE 108, upon entering the approximate region of the cell 106 or upon powering up/activating within the approximate region of the cell 106, conducts a cell search or initial access process to establish a communication link 120 with the base station 104. In general, this process includes the UE monitoring synchronization signaling from the base station 104 to identify the most-suitable beam/channel for its use (e.g., beam 111), obtaining the minimum necessary parameters for communicating with the base station 104 via the identified channel, and then communicating an identifier of the selected beam/channel to the base station 104 for purposes of establishing uplink and downlink components of the communication link 120 as is well known in the art.

Figure 2:
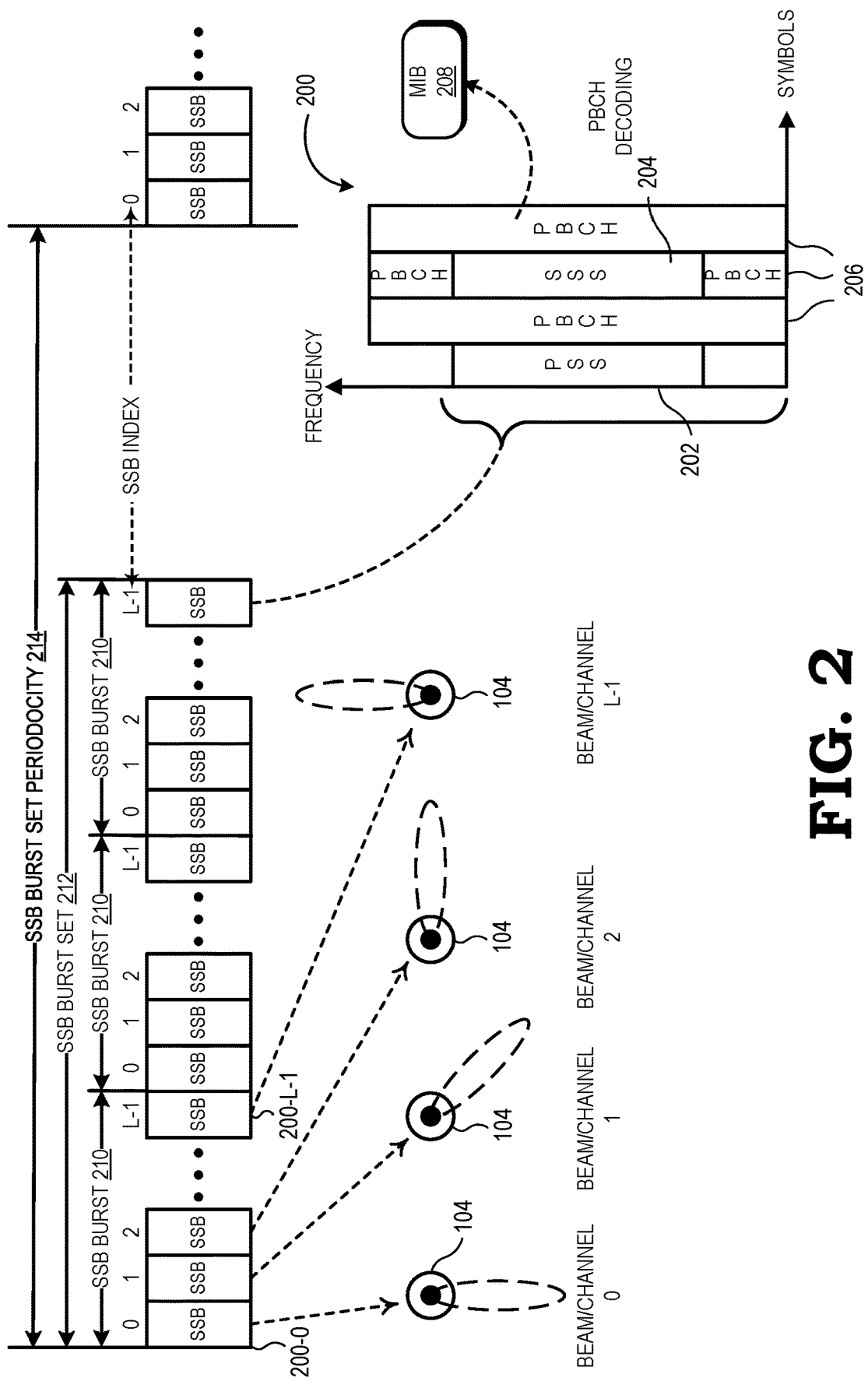
FIG. 2 is a diagram illustrating a SSB burst set configuration in accordance with a 5G NR protocol.

As illustrated by FIG. 2, in the 5G NR physical layer protocol, the basic unit of the synchronization signaling provided by the base station 104 is the synchronization signaling block (SSB), represented by diagram 200. As shown by diagram 200, an SSB is mapped to 4 orthogonal frequency-division multiplexing (OFDM) symbols in the time domain and 240 contiguous subcarriers in the frequency domain. This signaling configuration provides a Primary Synchronization Signal (PSS) 202, a Secondary Synchronization Signal (SSS) 204, and a Physical Broadcast Channel (PBCH) 206. The PSS 202 typically includes a binary phase shift keying (BPSK) modulated m-sequence of length 127 and the SSS 204 typically includes a BPSK modulated Gold sequence of length 127, and both of which are used for physical layer synchronization as is known in the art, including physical cell identification, downlink synchronization in the time and frequency domains, and acquire time instants for the PBCH channel. Together, the PSS 202 and SSS 204 can be used to identify up to 1008 different physical cell identities. The PBCH 206 carries the basic parameters and other system information to be used by a UE in the cell 106 to connect to the base station 104. In particular, the PBCH 206 is encoded with the data of a Master Information Block (MIB) 208, which contains various basic parameters needed by a receiving UE to establish communications with the transmitting base station, including the system frame number (SFN), subcarrier spacing, the frequency domain offset between the SSB and the overall resource block grid, and the like.

As noted above, the wireless network 100 utilizes beam sweeping for transmission of at least the synchronization signals, and thus utilizes a set of temporally-offset signal beams to cover the area of the cell 106. In the 5G NR protocol, each beam of the set is associated with a separate SSB. The resulting set of SSBs for the corresponding set of beams is transmitted as an SSB burst (e.g., SSB burst 210), with each SSB accorded a different temporal slot in the SSB burst. The SSB burst may be repeated one or more times in an SSB burst set (e.g., SSB burst set 212) to better ensure receipt of the SSBs by the UEs within the area of the cell 106. The SSB burst set is then repeated periodically on the basis of a specified SSB burst set periodicity 214. To illustrate, the 5G NR protocol specifies a 20 ms (millisecond) SSB burst set periodicity 214, with each SSB burst set limited to a maximum of 5 ms duration of every 20 ms period.

Within an SSB burst, each SSB is associated with a corresponding beam of the set of beams employed by the antenna array of the base station 104 for covering the area of the cell 106, and thus the position of the SSB within an SSB burst, that is, the SSB index, serves as an identifier of the corresponding beam, and thus an identifier of the channel represented by the corresponding beam. To illustrate, in the example of FIG. 2 the base station 104 employs a beam set of L beams, where the number L of beams that can be employed by the base station 104 is frequency dependent and typically is 2, 4, or 8, but can be up to 64 beams if the base station 104 is using signaling frequencies above 6 gigahertz (GHz)(that is, millimeter wave, or mmwave, frequencies). Accordingly, the SSB burst 210 includes a sequence of L SSBs in the time domain, with the first SSB 200_0 in the sequence having an SSB index of 0 and thus the corresponding beam/channel associated with the first SSB has a beam identifier (ID) or channel ID of 0, whereas the last SSB 200_L−1 in the sequence has an SSB index of L−1 and thus the corresponding beam/channel associated with the last SSB has a beam ID or channel ID of L−1. As described in greater detail below, while the SSB index of an SSB within an SSB burst is used in the encoding of the SSB itself; the SSB does not explicitly identify its SSB index, and thus the UE must obtain the SSB index through decoding of the SSB when the UE has identified the beam/channel associated with the SSB as the most-suitable beam for conducting communications using the selected beam/channel.

Figure 3:
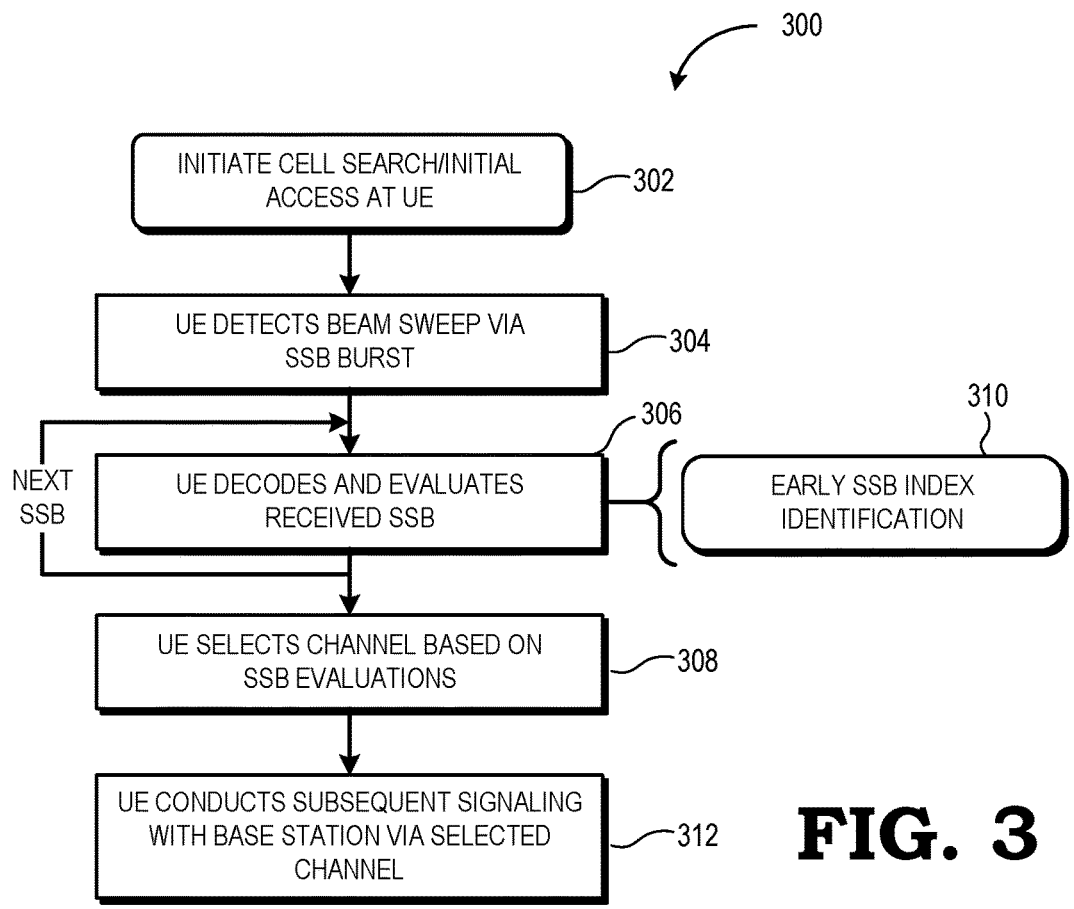
FIG. 3 is a flow diagram illustrating a method for cell search and initial access by the UE of FIG. 2 in accordance with some embodiments.

Turning to FIG. 3, a method 300 for an Initial Access process by the UE for establishing a connection with the base station 104 based on an early SSB index detection process is described in accordance with some embodiments. For ease of reference, the method 300 is described in the example context of the wireless network 100 of FIG. 1 and the synchronization signaling scheme of the 5G NR physical layer protocol as described with reference to FIG. 2. At block 302, the Initial Access process is initiated by the UE 108 in response to a triggering event, which may include, for example, exit of the UE 108 from another cell and entry into the general region of the cell 106, a power on reset (POR) or other activation event at the UE 108, and the like.

To facilitate the Initial Access process, the base station 104 performs a cell search process in which a beam sweep of direct beams covers the angular space of the cell 106. As explained above, this beam sweep includes the periodic transmission of an SSB burst set composed of one or more SSB bursts. Each SSB burst includes a temporal sequence of SSBs, with each SSB in the sequence associated with a corresponding beam of the beam sweep. Accordingly, during the Initial Access process the UE 108 monitors the appropriate radio frequency (RF) bands to detect the synchronization signaling of the beam sweep through detection of one or more SSBs in a corresponding the SSB burst set. In a 5G NR implementation, an SSB is detected through detection of the PSS 202 and SSS 204 contained therein as is known in the art. Because of the highly directional nature of each beam in the beam sweep, the UE 108 is likely to detect only one or a few of the SSBs of an SSB burst. To illustrate using the example of FIG. 1, with the UE 108 in the illustrated position within the cell 106, the UE 108 would presumably detect the SSB associated with beam 111 (assuming no significant interference) and potentially would detect the SSBs associated with beam 112 and possibly beam 113. However, in this scenario it is unlikely that the UE would detect the SSBs associated with beams 114-117 due to the directions in which these beams are projected.

For each detected SSB, at block 306 the UE 108 uses the SSB to evaluate the potential of the corresponding beam for use as a channel for the UE 108 to communicate with the base station 104. This evaluation process includes at least two components: decoding of the SSB to obtain the MIB 208 and the information contained therein; and evaluation of the signaling characteristics of the corresponding beam using the SSB. The decoding process involves the inverse of the coding and scrambling process employed to incorporate the MIB 208 into the PBCH 206, and is described in greater detail below with reference to FIGS. 4-6. The evaluation of the potential of the associated beam as the communication channel used by the UE 108 includes, for example, calculating the reference signal received power (RSRP) one or more of the PSS 202, the SSS 204, or the DeModulation Reference Signal (DMRS) used as a reference signal for decoding the PBCH 206, as well as determining if the attribute cellBarred of the MIB is set to "barred" and thus signaling that the cell 106 is not available to the UE 108.

After the process of block 306 has been repeated for each detected SSB, at block 308 the UE 108 selects a beam/channel as the "best" or "most appropriate" channel for use in communicating with the base station 104 based on the SSB evaluations. Typically, this selection process is based on the signal strength evaluation of the beam through evaluation of the synchronization signals of the SSB associated with the beam, with the beam having the highest signal strength or highest signal-to-noise ratio (SNR) selected as the "best" beam for use. However, other selection approaches or considerations may be implemented.

With the best beam/channel selected, at block 312 the UE initiates a communication link (e.g., communication link 120, FIG. 1) with the base station 104 on the basis of the selected beam/channel. In a 5G NR implementation, this typically is performed via a Random Access process in which the UE sends a Physical Random Access Channel (PRACH) signal to the base station 104 to signal to the base station 104 the presence of the UE 108 and to request use of resources associated with the selected best beam/channel for performing uplink and downlink communications between the UE 108 and the base station 104. The PRACH signal is transmitted using a set of resources (that is, resource blocks) in the signaling that is based on the SSB index of the SSB associated with the selected best channel. Thus, the base station 104 can identify which beam/channel to use for communicating with the UE 108 based on which set of resources is used by the UE 108 for transmitting the PRACH signal. As such, the UE 108 must have knowledge of the SSB index of the SSB associated with the selected best beam/channel in ordering to form and transmit the PRACH signal.

However, while needed by UEs in ordering to complete the Initial Access process, the 5G NR protocol does not provide for the SSB index of each SSB to be explicitly identified in the SSB itself or in associated signaling. Rather, the 5G NR physical layer protocols provide for the SSB index to be used in two places in the generation of the SSB: (1) in computing the initial seed value for the pseudo-random sequence employed in the Physical Downlink Channel (PDCH) DMRS process, and (2) the scrambling process employed for the PBCH. As explained below with reference to FIG. 4, the conventional approach to recovering the SSB index from an SSB is to start with an SSB index of 0, attempt to decode the PBCH 206 of the SBB with the SSB index, and if the correct result is not obtained, to increment the SSB index by one and attempt decoding again with the incremented SSB index, and repeat this process until the correct decoding result is obtained. In contrast, the Initial Access method 300 employed by the UE 108, in embodiments, utilizes an early SSB index detection process (represented by block 310) in which a prioritized ordering of the SSB indexes is identified, and the PBCH decoding process is then performed with this prioritized ordering of candidate SSB indexes to identify the correct SSB index for the SSB of interest. Example implementations of the early SSB index identification process 310 are described in greater detail below with reference to FIGS. 5 and 6.

Figure 4:
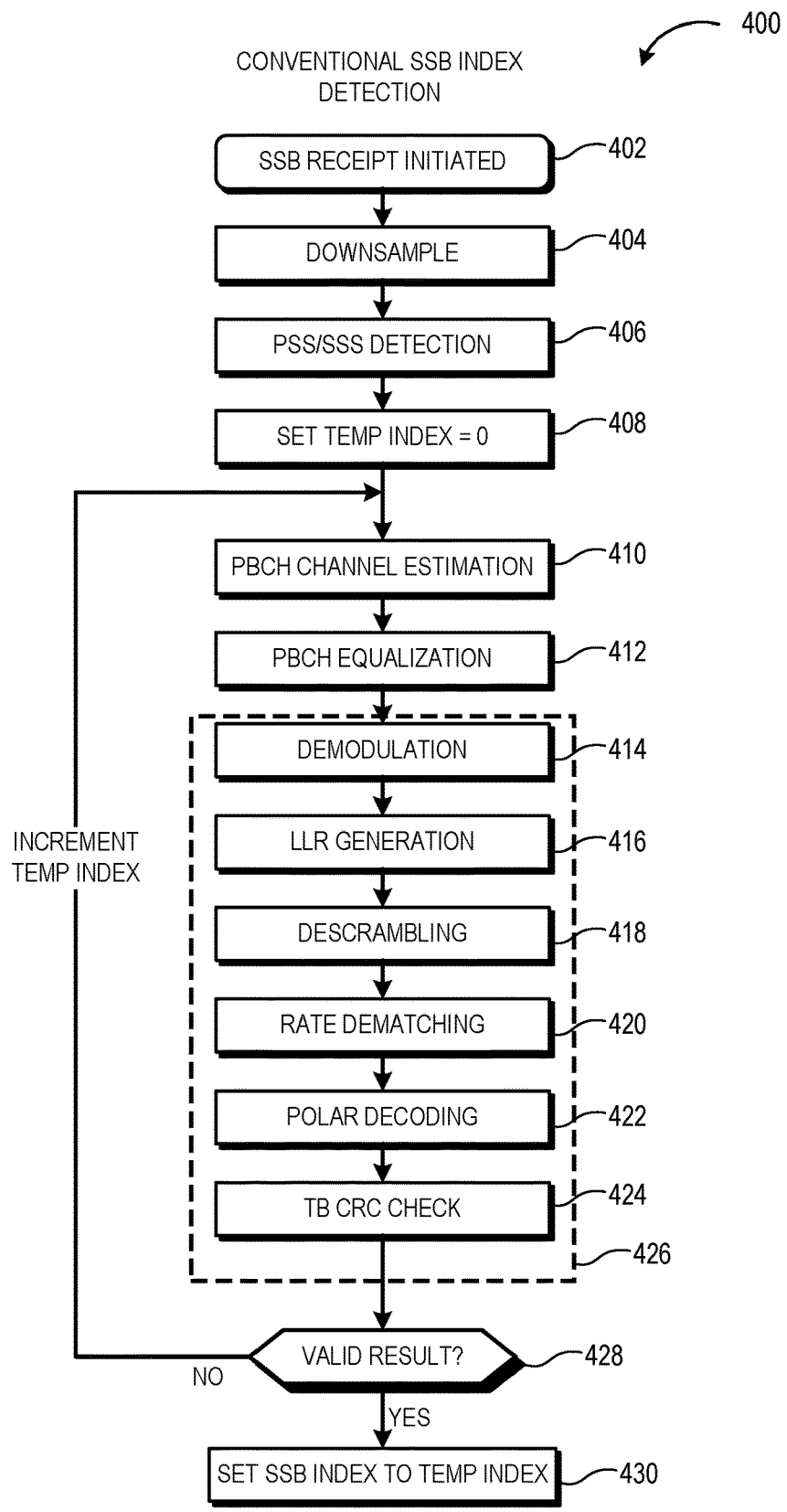
FIG. 4 is a flow diagram illustrating a conventional method for SSB index identification.

FIG. 4 illustrates the conventional approach ("method 400") for recovering the SSB index of an SSB of interest through iterative decoding of the SSB via incrementation of the SSB index value used for each decoding iteration. The method 400 initiates at block 402 with the initiation of receipt of an SSB within an SSB burst at a conventional UE. In response to detecting the start of the SSB, at block 404 the UE downsamples the representative signal (block 404) and performs the detection process (block 406) for the PSS and SSS as is well known in the art. With the SSB detected and verified, the conventional UE begins the conventional SSB index detection process by setting a temp index value to zero and at block 408 and then performing an iteration of the standard PBCH decoding process using the temp index value as the SSB index value used during this PBCH decoding process.

In a 5G NR implementation, the PBCH of an SSB is encoded by performing a first scrambling of the MIB 208, appending a cyclical redundancy check (CRC) value to the resulting scrambled bits, then polar coding the scrambled bits and CRC value to generate polar coded bits. These polar coded bits are then subjected to a second scrambling process using a seed value that is based in part on the SSB index of the SSB, and the result is then inserted into the SSB as the PBCH. Accordingly, the PBCH decoding process involves the inverse of this process, with additional signal processing steps. As such, the PBCH decoding process includes: a PBCH channel estimation process (block 410); a PBCH equalization process (block 412) on the results of the PBCH channel estimation process; a demodulation process (block 414) following equalization; a log-likelihood ratio (LLR) generation process (block 416); a descrambling process (block 418) following the LLR generation process (whereby this descrambling process is the inverse of the second scrambling process employed in the PBCH encoding process); then a rate dematching process (420) and a polar decoding process (block 422), followed by transport block (TB) CRC check process (block 424) on the result of the polar decoding. These processes are well known in the art and thus are not described in detail herein.

However, before proceeding further, it should be noted how the SSB index for an SSB is utilized in the PBCH generation process, and thus how it implicitly manifests itself through the PBCH decoding process. When a base station prepares the Broadcast Channel (BCH) data that serves as the basis for the MIB 208 in an SSB, the base station 104 includes the X most significant bits (MSB) of the SSB index in corresponding bit positions of the BCH, where X is 3 when L=64 (that is, the $6^{th}$, $5^{th}$, and $4^{th}$ bits of the SSB index are included in the BCH) and X is 2 when L is 4 or 8 (that is, the $5^{th}$ and $4^{th}$ bits of the SSB index are included in the BCH). The two least significant bits (LSB) of the SSB index when L is 4, or the three LSB of the SSB index when L is 8 or 64, are used in the scrambling operation following the polar coding. Further, when performing pseudo-random sequencing for forming the PBCH DMRS, the two LSB of the SSB index (when L=4) or the three LSB of the SSB index (when L=8 or 64) are used in generating the seed value that starts the pseudo-random sequence.

Accordingly, with the SSB index only implicitly defined by the SSB through incorporation of various bits of the SSB index in the PBCH data, the conventional UE performs an iteration of the PBCH decoding process represented by blocks 410-424 using the corresponding bits of the temp SSB index value initially set to zero at block 408 at various steps in this decoding process, including using the corresponding LSB bits of the temp SSB index value in the descrambling process of block 418, as well as during channel estimation (which uses DMRS, which in turn depends on the SSB index). Note that the PBCH decoding process represented by 414-426 is referred to herein as the post-equalization processing 427. At the end of the iteration of the PBCH decoding process using the temp SBB index value, at block 428 the conventional UE would check to see if the decoding process using this value for the SSB index provides a valid, or correct, result. In one embodiment, a correct result is indicated by the CRC check performed at block 424 arriving at the correct CRC value.

If the result of the decoding process is valid or correct, the conventional UE concludes that the temporary SSB index value used for the current iteration is in fact the SSB index for the SSB being processed, and thus sets or otherwise identifies the temporary SSB index value as the SSB index for the SSB at block 430. Otherwise, if the result is not valid, the temporary SSB index value is incremented by one, and the process of blocks 410-428 is repeated again using the updated temporary SSB index value. This process thus repeats until the correct SSB index value is identified. As such, assuming a normal distribution, it would take, on average, L/2 iterations of the entire PBCH decoding process to identify the correct SSB index for the SSB, and L iterations of the entire PBCH decoding process in a worst-case scenario (where L represents the number of SSB index values, e.g., 4, 8, or 64).

Figure 5:
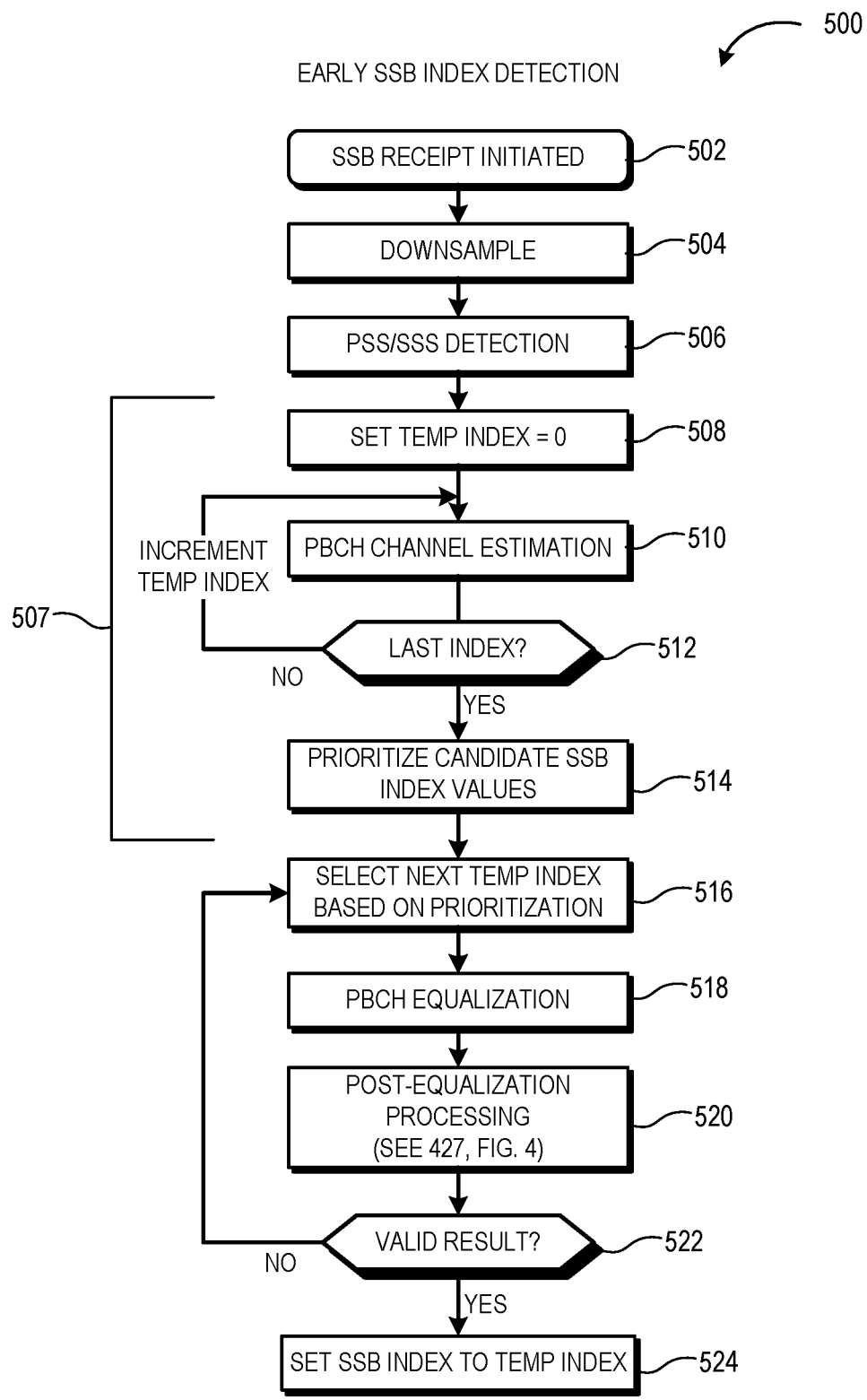
FIG. 5 is a diagram illustrating a method for early SSB index detection in accordance with some embodiments.
Figure 6:
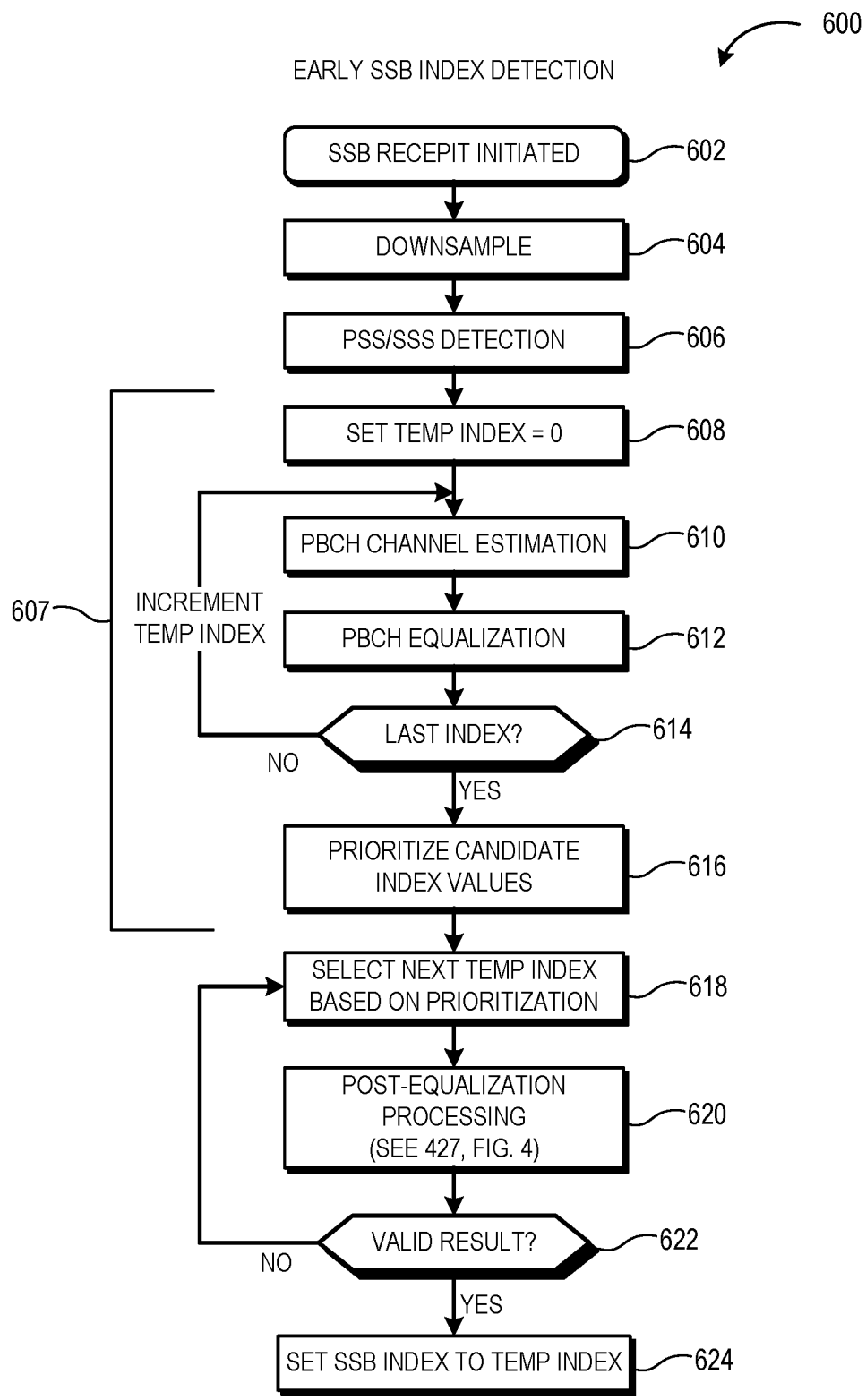
FIG. 6 is a diagram illustrating another method for early SSB index detection in accordance with some embodiments.

Turning now to FIGS. 5 and 6, two example implementations of the early SSB index identification process of block 310 of FIG. 3 are illustrated in accordance with some embodiments. For both implementations, rather than iterate through the entire PCBH decoding process starting with the first SSB index, these early SSB index detection methods instead direct the UE 108 to ordering the candidate SSB index values in a prioritization ordering correlating to most likely to least likely of the candidate SSB index values. The UE 108 then performs one or more iterations of the PBCH decoding process using a candidate SSB index values in ordering of their prioritization. This approach permits the UE 108 to evaluate the most likely SSB index candidates first, and thus reduce, on average, the number of iterations of the test decoding process using an SSB index candidate, and thus reducing the overall resources required to identify the correct SSB index compared to the conventional brute-force starting-at-zero iterative technique.

The early SSB index detection method 500 of FIG. 5 initiates with detection by the UE 108 of transmission of an SSB by the base station 104 at block 502, followed by downsampling (block 504) and PSS/SSS detection (block 506) for the SSB as is known in the art. The UE 108 then performs an SSB index candidate prioritization process 507. In the illustrated embodiment, the SSB index candidate prioritization process is based in part on the channel estimates for the PBCH obtained using each potential SSB index. Accordingly, at block 508 the UE 108 sets a temp SSB index value to zero and then at block 510 the UE 108 performs PBCH channel estimation based on the temp SSB index value and buffers the results for subsequent use in prioritizing. Details on the PBCH channel estimation process are described in greater detail below with reference to FIGS. 7 and 8. The UE 108 then increments the temp SSB index value and repeats the PBCH channel estimation process of block 510 using the incremented temp SSB index value. The UE 108 iterates this process for each potential SSB index value until the UE 108 determines at block 512 that each potential SSB index values has been used to perform an iteration of the PBCH channel estimation. With channel estimates obtained for all potential SSB index values, at block 514 the UE 108 generates a prioritized ordering of the candidate SSB index values based on the channel estimates. Examples of this process are described in greater detail below with reference to FIGS. 7 and 8.

With a prioritized ordering of candidate SSB index values identified, the UE 108 performs, on average, a smaller number of iterations of the PBCH decoding process compared to the conventional brute-force approach, with each iteration corresponding to use of a candidate SSB index value selected in the priority ordering determined at block 514. Accordingly, at a first iteration of this process, at block 516 the UE 108 selects the highest priority candidate SSB index value (that is, the most likely SSB index value from the prioritized ordering). At block 518 a PBCH equalization process is performed and then at block 520 the UE 108 performs post-equalization processing using the selected candidate SSB index value in accordance with the post-equalization process 427 described above with reference to FIG. 4. At the end of the iteration of the PCBH decoding process using the selected candidate SSB index value, at block 522 the UE 108 determines whether the decoding process using this value for the SSB index provides a valid, or correct, result as indicated by, for example, the CRC check performed at block 424 (FIG. 4) arriving at the correct CRC value. If the result is not valid, the UE 108 returns to block 516 and selects the next candidate SSB index value based on the prioritization ordering, and an iteration of the process of blocks 518-522 is repeated using this newly selected candidate SSB index value. Otherwise, if the result of the decoding process is valid or correct, the UE 108 concludes that the currently selected candidate SSB index value used for the current iteration is in fact the actual SSB index for the SSB being processed, and thus sets or otherwise identifies the currently selected candidate SSB index value as the SSB index for the SSB at block 524.

Turning now to FIG. 6, a second example of early SSB index detection is illustrated in accordance with some embodiments. The depicted method 600 initiates with detection by the UE 108 of transmission of an SSB by the base station 104 at block 602, followed by downsampling (block 604) and PSS/SSS detection (block 606) for the SSB as is known in the art. The UE 108 then performs an SSB index prioritization process 607 similar to the SSB index candidate prioritization process 507 of method 500 of FIG. 5 in that the SSB index candidate prioritization process 607 is based in part on the channel estimates for the PBCH DMRS obtained using each potential SSB index. However, in contrast to the process 507 of method 500, the process 607 prioritizes candidate SSB index values subsequent to PBCH equalization.

Accordingly, at block 608 the UE 108 sets a temp SSB index value to zero and then at block 610 the UE 108 performs PBCH channel estimation based on the temp SSB index value and then performs PBCH equalization (block 612). The UE 108 then increments the temp SSB index value and repeats the PCHB channel estimation process of block 510 and PBCH equalization process of block 612 using the incremented temp SSB index value. The UE 108 iterates this process for each potential SSB index value until the UE 108 determines at block 614 that all potential SSB index values have been used to perform an iteration of the PBCH channel estimation. With channel estimates obtained for all potential SSB index values, at block 616 the UE 108 prioritizes the candidate SSB index values based on the channel estimates to generate a prioritized ordering of candidate SSB indexes. An example of this post-equalization prioritization process is described in greater detail below with reference to FIG. 9.

With the prioritized ordering of candidate SSB index value identified, a first iteration of the post-equalization PBCH processing is performed. Accordingly, at block 618 the UE 108 selects the highest priority candidate SSB index value. At block 620 the UE 108 performs post-equalization processing using the selected candidate SSB index value in accordance with the post-equalization process 427 described above with reference to FIG. 4. At the end of the iteration of the PCBH decoding process using the selected candidate SSB index value, at block 622 the UE 108 determines if the decoding process using this value for the SSB index provides a valid, or correct, result as indicated by, for example, the CRC check performed at block 424 (FIG. 4) arriving at the correct CRC value. If the result is not valid, UE 108 returns to block 618 and selects the next candidate SSB index value based on the prioritization ordering, and an iteration of the process of blocks 618-622 is repeated using this newly selected candidate SSB index value. Otherwise, if the result of the decoding process is valid or correct, the UE 108 concludes that the currently selected candidate SSB index value used for the current iteration is in fact the actual SSB index for the SSB being processed, and thus sets or otherwise identifies the currently selected candidate SSB index value as the SSB index for the SSB at block 622.

Thus, rather than performing an average of L/2 iterations of the PBCH decoding process to identify the actual SSB index as required by the conventional brute-force approach, the illustrated early SSB index detection process prioritizes the SSB index values by ordering the candidate SSB index values based on an estimate of likelihood to represent the actual SSB index and then iteratively testing the candidate SSB index values based on this ordering to identify the actual SSB index. Assuming accurate prioritization of the candidate SSB index values, the average number of iterations may be considerably less than L/2, and thus requiring less resources, on average, to arrive at the actual SSB index compared to the conventional brute-force method.

FIGS. 7 and 8 illustrate example implementations of the candidate SSB index value selection and prioritization process of block 514 of method 500 of FIG. 5 in accordance with some embodiments. Although these two examples are described, the index value prioritization process may implement any of a variety of methods using the principles and guidelines described herein. The example implementation of FIG. 7 is based on an observation that there typically will be high correlation between channel estimates between consecutive OFDM symbols in the synchronization signaling, and thus a high correlation between the PSS 202 and/or SSS 204 of an SSB of interest and the PBCH channel estimate obtained at an iteration of block 510 of FIG. 5 using the correct SSB index. Accordingly, at block 702 the UE obtains channel estimates for the SSB of interest using one or both of the PSS 202 and the SSS 204 of the SSB. In particular, the process of block 702 can leverage the channel estimate process already performed on the PSS 202 to perform coherent SSS detection, which in turn typically provides a detection gain metric. Blocks 704_0 through 704_L−1 in turn represent the PCBH DMRS channel estimates obtained at the L iterations of block 510 of FIG. 5 for the L possible SSB index values, with block 704_0 representing the iteration of block 510 to obtaining channel estimates using an SSB index value of 0, block 704_1 representing the iteration of block 510 to obtaining channel estimates using an SSB index value of 1, and so forth. Then, as represented by blocks 706_0 through 706_L−1, the channel estimates for PSS/SSS determined at block 702 are compared with the PCBH DMRS channel estimates determined for each SSB index value in turn, with block 706_0 representing the comparison of the PSS/SSS channel estimates with the PBCH DMRS channel estimates obtained at block 704_0 using an SSB index value of 0, block 706_1 representing the comparison of the PSS/SSS channel estimates with the PBCH DMRS channel estimates obtained at block 704_1 using an SSB index value of 1, and so forth. The comparison employed by blocks 706_0 through 706_L−1 can be any of a variety of comparison techniques, such as a regular or plain correlation analysis between channel estimates, calculation of Euclidean distance, and the like. Moreover, the comparison may be between the PBCH DMRS channel estimates and the PSS channel estimates only, the SSS channel estimates only, or a combination of the PSS and SSS channel estimates, or a comparison between the PBCH DMRS channel estimates and the PSS channel estimates, a similar comparison with the SSS estimates, and then some final combination of both comparisons. Moreover, while the PBCH 206 covers three OFDM symbols, the PBCH DMRS estimates can be calculated on a per-symbol basis or taken across all three symbols. Moreover, any number of points used in the comparison. For example, every subcarrier may be considered, or only a subset thereof, and channel estimates across subcarriers may be averaged or otherwise combined, or each considered separately. Moreover, the channel estimates for both PBCH DMRS and PSS/SSS may be performed for the time domain or the frequency domain, or both.

Each of the correlation blocks 706_0 through 706_L−1 generates a corresponding confidence metric that represents the degree of correlation between the PSS/SSS channel estimates and the PCBH DMRS channel estimates obtained for the corresponding SSB index value. Accordingly, at block 708 the UE 108 prioritizes the SSB index values based on their corresponding confidence metrics to generate a prioritized ordering 710 of the candidate SSB index values, with the candidate SSB index values ordered from the SSB index value having the highest confidence metric (identified as SSB_C0) to the SSB index value having the lowest confidence metric (identified as SSB_CM-1). This prioritized ordering 710 of candidate SSB index values thus serves as the prioritized list or ordering of candidate SSB index values used in the early SSB index detection process.

Turning now to the example implementation of the candidate selection and prioritization process of block 514 illustrated by FIG. 8, this implementation is based on an observation that channel estimates are expected to vary relatively slowly in the time and frequency domains, and thus channel estimates when the actual SSB index value is used should be correlated across time and frequency. In contrast, the channel estimates using the "wrong" SSB index values are expected to be randomly distributed since the transmitted pseudo-random DMRS sequences will not match between the transmit-side and receive-side, and thus correlations across channel estimates for a given "wrong" SSB index is expected to be low. Thus, in the implementation of FIG. 8, the correlation of channel estimates is not performed between PSS/SSS and PBCH DMRS as shown in FIG. 7, but rather between elements within channel estimates of a given PBCH DMRS SSB index.

Accordingly, as with blocks 704_0 to 704_L-1 of FIG. 7, blocks 804_0 to 804_L-1 represent the PBCH DMRS channel estimates obtained by the UE 108 for each of the L potential SSB index values, with block 804_0 representing the process of obtaining PBCH DMRS channel estimates using an SSB index value of 0, block 804_1 representing the process of obtaining PBCH DMRS channel estimates using an SSB index value of 1, and so forth. At each of blocks 806_0 through 806_L-1, the UE 108 analyzes the channel estimates in time and frequency domains to obtain a metric representing a degree of confidence on the estimated channel being an estimate of the actual propagation channel as opposed to likely chaotic numbers obtained from running the channel estimation on a mismatched locally-generated DMRS sequence. Any of a variety of correlation techniques may be employed, such as plain correlation, Euclidean distance, and the like. At block 808 the UE 108 identifies the one or more SSB index values most likely to represent the actual SSB index of the SSB based on the confidence metric, and generates a prioritized ordering 810 of the candidate SSB index values therefrom in the same manner as described above with reference to the generation of the prioritized ordering 710 of the candidate index values at block 708.

Figure 9:
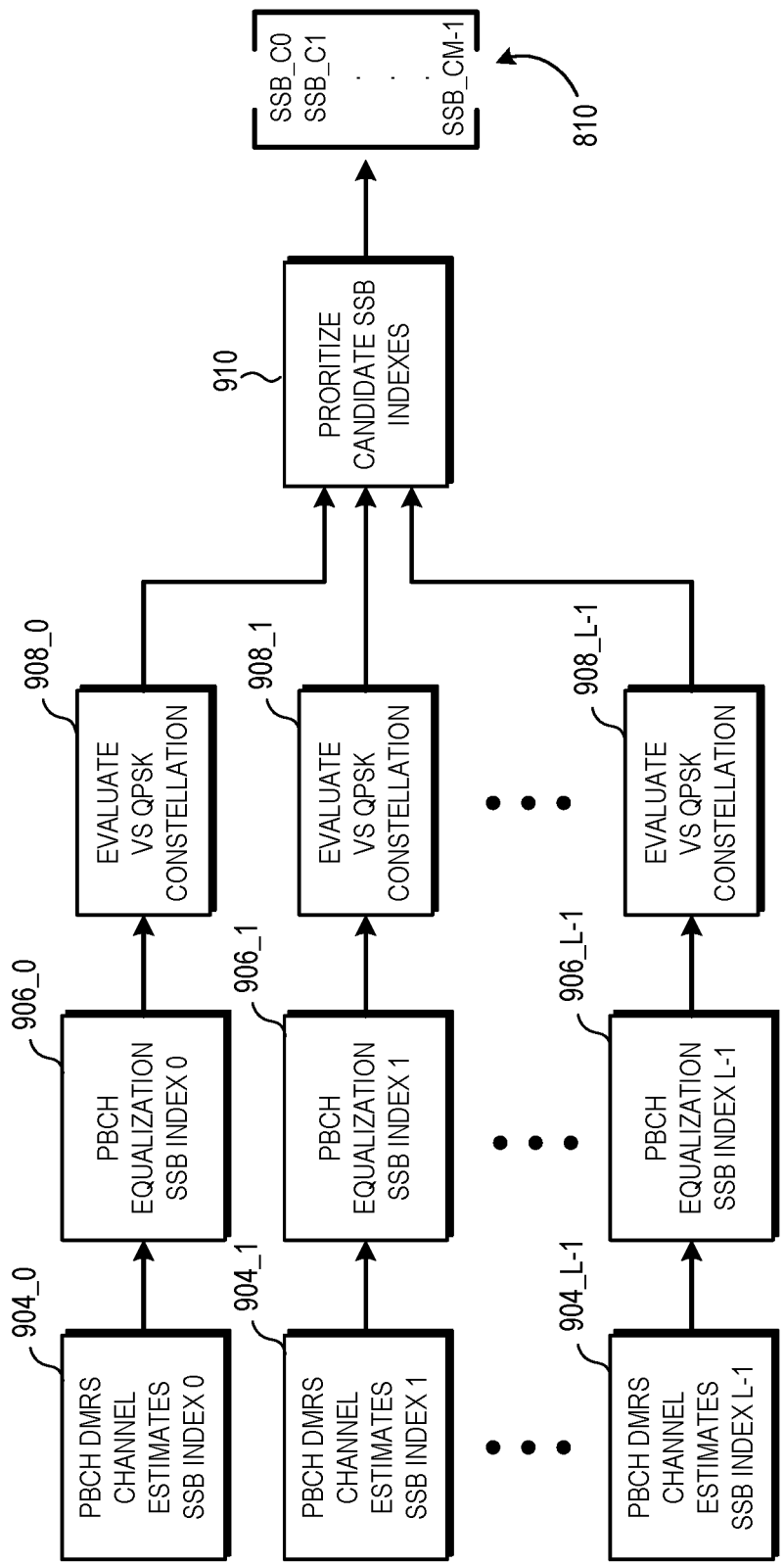
FIG. 9 is a diagram illustrating yet another method for SSB index candidate prioritization in accordance with some embodiments.

FIG. 9 illustrates an example implementation of the candidate SSB index value prioritization process of block 616 of method 600 of FIG. 6 in accordance with some embodiments. Although one example is described, the index value selection and prioritization process may implement any of a variety of methods using the principles and guidelines described herein. In contrast to the example techniques of FIGS. 7 and 8, the example implementation of FIG. 9 is performed after PBCH equalization, and thus is based on an observation that because the PBCH is represented using quadrature phase shift keying (QPSK) modulation, an iteration of the equalization process at block 612 (FIG. 6) on a PBCH DRMS signal generated using a given SSB index value should produce an equalized signal that maps to a QPSK constellation if the SSB index value is in fact the actual SSB index used to encode the PBCH. In contrast, iterations of the equalization process at block 612 using the "wrong" SSB index values should produce incorrect signaling, and thus the equalized result would not adequately map to a QPSK constellation. Accordingly, blocks 904_0 to 904_L-1 represent the PBCH DMRS channel estimates obtained by the UE 108 for the L iterations of block 610 (FIG. 6), one iteration for each of the L potential SSB index values. As such, block 904_0 represents the process of obtaining PBCH DMRS channel estimates using an SSB index value of 0, block 904_1 represents the process of obtaining PBCH DMRS channel estimates using an SSB index value of 1, and so forth. Each of blocks 906_0 through 906_L-1 represents a corresponding iteration of the PBCH equalization process (block 612) applied to the data symbols using the PBCH DMRS channel estimates generated for the corresponding one of blocks 904_0 through 904_L-1 so as to generate corresponding equalized channel estimates.

At each of blocks 908_0 through 908_L-1, the UE 108 evaluates the equalized signal elements (channel estimates and data) from the corresponding one of blocks 906_0 through 906_L-1 with the appropriate QPSK constellation to determine a corresponding confidence metric that represents the degree to which the equalized signal generated using a the associated SSB index value maps to the QPSK constellation. At block 910 the UE 108 identifies the likelihood that each SSB index values represents the actual SSB index of the SSB based on the confidence metrics, and thus generates a prioritized ordering 912 of the candidate SSB index values based on the confidence metrics in the same manner as described above with reference to the generation of the prioritized ordering 710 of the candidate index values at block 708 of FIG. 7 and the generation of the prioritized ordering 810 of the candidate index values at block 808 of FIG. 8.

Figure 10:
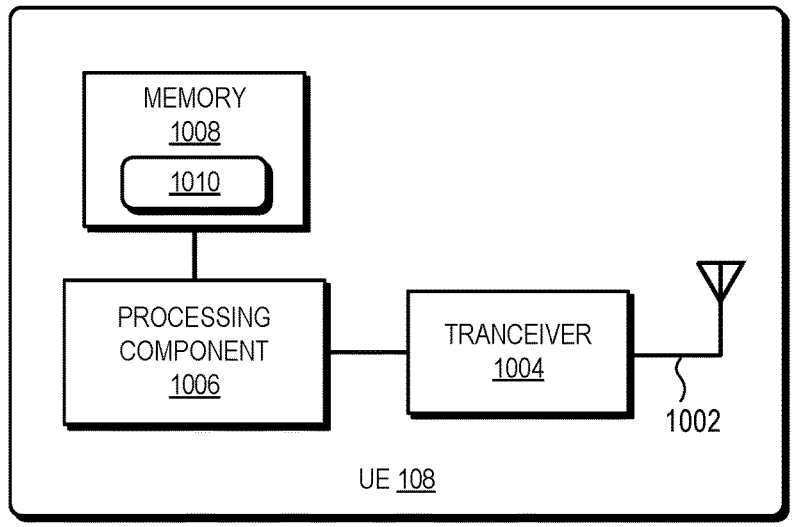
FIG. 10 is a block diagram of a user equipment (UE) of the wireless network of FIG. 1 in accordance with some embodiments.

FIG. 10 illustrates an example implementation of the UE 108 of the wireless network 100 of FIG. 1 in accordance with some embodiments. The UE 108 may include any of a variety of wireless-enabled electronic devices, including a smartphone, a smartwatch or other compute-enabled wearable device, a notebook, tablet, or desktop computer, a gaming console, a wireless appliance, a vehicular wireless communication component, and the like. In the depicted embodiment, the UE 108 includes one or more physical antennas 1002 to conduct RF signaling with a corresponding base station (e.g., base station 104, FIG. 1), a transceiver 1004 to interface with the one or more physical antennas 1002 for converting RF signaling received from the antenna 1002 to digital data and to convert digital data to RF signaling for transmission by the antenna 1002, and one or more processing components 1006 coupled to, or implemented as part of, the transceiver 1004. The one or more processing components can include, for example, a digital signal processor (DSP) or other application-specific integrated circuit (ASIC), a central processing unit (CPU), a graphics processing unit (GPU), a programmable logic device, or some combination thereof. In implementations in which the one or more processing components 1006 includes a CPU or GPU, the processing component 1006 may be associated with a memory 1008, hard disc drive, or other tangible, non-transitory computer readable medium that stores one or more software programs 1010 representing one or more sets of executable instruction. Further, in some embodiments, one or more of the one or more processing components 1006 may be implemented as part of the transceiver 1004 (that is, the transceiver 1004 may implement one or more processing components 1006). The UE 108 further may include a number of other components well known in the art and which have been omitted from FIG. 10 for ease of illustration, including power supplies, display panels, keyboards, touchscreens, and other input/output (I/O) devices, and the like.

Various combinations of the transceiver 1004 and the one or more processing components 1006 together implement one or more of the techniques described above. To illustrate with respect to the early SSB index detection methods of FIGS. 5 and 6, in some embodiments, the transceiver 1004 converts the analog RF signaling received via the physical antenna 1002 and performs the downsampling processes of blocks 504, 604 on the resulting digital signal, while a DSP (one embodiment of the processing component 1006) performs the remaining portion of the early SSB index detection method using the downsampled result output by the transceiver 1004. In other embodiments, the candidate SSB index selection and prioritization process represented by blocks 514 and 616 of FIGS. 5 and 6, respectively, may be offloaded from the DSP to a CPU or a GPU (another embodiment of a processing component 1006), which in turn executes one or more software programs 1010 representing sets of executable instructions that, when executed, manipulate the CPU or GPU to perform the candidate SSB index selection and prioritization technique using channel estimates data provided by the DSP and then providing the DSP with the resulting targeted set of candidate SSB index values for use by the DSP in determining the actual SSB index, as described above.

Note that not all of the activities or elements described above in the general description are required, that a portion of a specific activity or device may not be required, and that one or more further activities may be performed, or elements included, in addition to those described. Still further, the ordering in which activities are listed are not necessarily the ordering in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a user equipment, a synchronization signal block (SSB) of an SSB burst transmitted by a base station, the SSB burst comprising a set of SSBs including the received SSB, each SSB associated with a different beam transmitted by the base station and having a corresponding index value representing a position of the SSB in the SSB burst;
   prioritizing a set of index values representing SSB positions in the SSB burst to generate a prioritized ordering of index values, wherein said prioritizing the set of index values comprises
      determining synchronization signal (SS) channel estimates based on at least one of a primary synchronization signal (PSS) and a secondary synchronization signal (SSS) of the SSB,
      for each index value of the set of index values representing SSB positions of SSBs in the SSB burst:
         determining physical broadcast channel PBCH) demodulation reference signal (DMRS) channel estimates generated using the index value, and
         determining a confidence metric for the index value, the confidence metric representing a degree of correlation between the SS channel estimates and the PBCH DMRS channel estimates, and
      prioritizing the index values of the set based on the corresponding confidence metrics to generate the prioritized ordering of index values;
   performing one or more iterations of a decoding process for a PBCH of the received SSB using a different candidate index value selected from the set of index values based on the prioritized ordering until a valid decoding is detected; and
   identifying the candidate index value used for the iteration of the decoding process for the PBCH that resulted in the valid decoding as the index value for the SSB.

2. A method comprising:
   receiving, at a user equipment, a synchronization signal block (SSB) of an SSB burst transmitted by a base station, the SSB burst comprising a set of SSBs including the received SSB, each SSB associated with a different beam transmitted by the base station and having a corresponding index value representing a position of the SSB in the SSB burst;
   prioritizing a set of index values representing SSB positions in the SSB burst to generate a prioritized ordering of index values, wherein said prioritizing the set of index values comprises
      for each index value of the set of index values representing SSB positions of SSBs in the SSB burst, determining a corresponding confidence metric representing a physical broadcast channel (PBCH) demodulation reference signal (DMRS) channel estimates generated using the index value, and
      prioritizing the index values of the set based on the corresponding confidence metrics to generate the prioritized ordering of index values;
   performing one or more iterations of a decoding process for a PBCH of the received SSB using a different candidate index value selected from the set of index values based on the prioritized ordering until a valid decoding is detected; and
   identifying the candidate index value used for the iteration of the decoding process for the PBCH that resulted in the valid decoding as the index value for the SSB.

3. The method of claim 2, further comprising:
   initiating a random access process from the user equipment to the base station via a random access channel (RACH) using resource blocks associated with the identified index value for the SSB.

4. The method of claim 2, further comprising:
identifying an iteration of the decoding process for the PBCH as providing the valid decoding based on a cyclical redundancy check (CRC) performed on a result of the iteration of the decoding process.

5. The method of claim 2, wherein the user equipment and the base station are part of a wireless network implementing a fifth generation (5G) new radio (NR) standard.

6. A method comprising
receiving, at a user equipment, a synchronization signal block (SSB) of an SSB burst transmitted by a base station, the SSB burst comprising a set of SSBs including the received SSB, each SSB associated with a different beam transmitted by the base station and having a corresponding index value representing a position of the SSB in the SSB burst;
prioritizing a set of index values representing SSB positions in the SSB burst to generate a prioritized ordering of index values, wherein said prioritizing the set of index values comprises
for each index value of the set of index values representing SSB positions of SSBs in the SSB burst:
determining a physical broadcast channel (PBCH) demodulation reference signal (DMRS) generated using the index value,
equalizing the PBCH DMRS signal to generate an equalized signal, and
determining a confidence metric for the index value based on an evaluation of the equalized signal and a quadrature phase shift keying (QPSK) constellation, and
prioritizing the index values of the set based on the corresponding confidence metrics to generate the prioritized ordering of index values;
performing one or more iterations of a decoding process for a PBCH of the received SSB using a different candidate index value selected from the set of index values based on the prioritized ordering until a valid decoding is detected; and
identifying the candidate index value used for the iteration of the decoding process for the PBCH that resulted in the valid decoding as the index value for the SSB.

7. A user equipment comprising:
an antenna configured to receive radio frequency (RF) signaling representing a synchronization signal block (SSB) of an SSB burst transmitted by a base station, the SSB burst comprising a set of SSBs, each SSB associated with a different beam transmitted by the base station and having a corresponding index value representing a position of the SSB in the SSB burst;
a transceiver coupled to the antenna and configured to convert the RF signaling to digital data; and
at least one processing component configured to:
prioritize a set of index values representing SSB positions in the SSB burst to generate a prioritized ordering of index values, wherein the at least one processing component is further configured to prioritize the set of index values by
determining synchronization signal (SS) channel estimates based on at least one of a primary synchronization signal (PSS) and a secondary synchronization signal (SSS) of the SSB;
for each index value of the set of index values representing SSB positions of SSBs in the SSB burst:
determining physical broadcast channel PBCH) demodulation reference signal (DMRS) channel estimates generated using the index value; and
determining a confidence metric for the index value, the confidence metric representing a degree of correlation between the SS channel estimates and the PBCH DMRS channel estimates; and
prioritizing the index values of the set based on the corresponding confidence metrics to generate the prioritized ordering of index values,
perform one or more iterations of a decoding process for a PBCH of a received SSB using a different candidate index value selected from the set of one or more candidate index values based on the prioritized ordering for the iteration until a valid decoding of the PBCH is detected, and
identify the candidate index value used for the iteration of the decoding process for the PBCH that resulted in the valid decoding as the index value for the SSB.

8. A user equipment comprising:
an antenna configured to receive radio frequency (RF) signaling representing a synchronization signal block (SSB) of an SSB burst transmitted by a base station, the SSB burst comprising a set of SSBs, each SSB associated with a different beam transmitted by the base station and having a corresponding index value representing a position of the SSB in the SSB burst;
a transceiver coupled to the antenna and configured to convert the RF signaling to digital data; and
at least one processing component configured to:
prioritize a set of index values representing SSB positions in the SSB burst to generate a prioritized ordering of index values, wherein the at least one processing component is further configured to prioritize the set of index values by
for each index value of the set of index values representing SSB positions of SSBs in the SSB burst, determining a corresponding confidence metric representing a degree of correlation in both time and frequency domains of PBCH demodulation reference signal (DMRS) channel estimates generated using the index value; and
prioritizing the index values of the set based on the corresponding confidence metrics to generate the prioritized ordering of index values,
perform one or more iterations of a decoding process for a PBCH of a received SSB using a different candidate index value selected from the set of one or more candidate index values based on the prioritized ordering for the iteration until a valid decoding of the PBCH is detected, and
identify the candidate index value used for the iteration of the decoding process for the PBCH that resulted in the valid decoding as the index value for the SSB.

9. The user equipment of claim 8, wherein the at least one processing component is further configured to:
control the transceiver to initiate a random access process with the base station via a random access channel (RACH) using resource blocks associated with the identified index value for the SSB.

10. The user equipment of claim 8, wherein the at least one processing component is further configured to:
identifying an iteration of the decoding process for the PBCH as providing the valid decoding based on a cyclical redundancy check (CRC) performed on a result of the iteration of the decoding process.

11. The user equipment of claim 8, wherein the user equipment is compliant with a fifth generation (5G) new radio (NR) standard.

12. A user equipment comprising:
an antenna configured to receive radio frequency (RF) signaling representing a synchronization signal block (SSB) of an SSB burst transmitted by a base station, the SSB burst comprising a set of SSBs, each SSB associated with a different beam transmitted by the base station and having a corresponding index value representing a position of the SSB in the SSB burst;
a transceiver coupled to the antenna and configured to convert the RF signaling to digital data; and
at least one processing component configured to:
prioritize a set of index values representing SSB positions in the SSB burst to generate a prioritized ordering of index values, wherein the at least one processing component is further configured to prioritize the set of index values by
for each index value of the set of index values representing SSB positions of SSBs in the SSB burst:
determining PBCH demodulation reference signal (DMRS) channel estimates generated using the index value;
equalizing a PBCH DMRS to generate an equalized signal; and
determining a confidence metric for the index value based on an evaluation of the equalized signal and a quadrature phase shift keying (QPSK) constellation; and
prioritizing the index values of the set based on the corresponding confidence metrics to generate the prioritized ordering of index values,
perform one or more iterations of a decoding process for a PBCH of a received SSB using a different candidate index value selected from the set of one or more candidate index values based on the prioritized ordering for the iteration until a valid decoding of the PBCH is detected, and
identify the candidate index value used for the iteration of the decoding process for the PBCH that resulted in the valid decoding as the index value for the SSB.

13. A wireless network comprising:
a base station configured to wirelessly transmit radio frequency (RF) signaling representing synchronization signal block (SSB) burst comprising a set of SSBs, each SSB associated with a different beam transmitted by the base station and having a corresponding index value representing a position of the SSB in the SSB burst; and
a user equipment configured to:
detect an SSB of the SSB burst; and
identify an index value of the SSB by iteratively performing a decoding process for a physical broadcast channel (PBCH) of the SSB, each performed iteration using a different index values selected from a prioritized ordering of a set of index values representing the positions of the SSBs in the SSB burst, wherein the user equipment is further configured to determine the prioritized ordering of the set of indexed values by:
determining synchronization signal (SS) channel estimates based on at least one of a primary synchronization signal (PSS) and a secondary synchronization signal (SSS) of the SSB,
for each index value of the set of index values representing SSB positions of SSBs in the SSB burst:
determining primary broadcast channel (PBCH) demodulation reference signal (DMRS) channel estimates generated using the index value, and
determining a confidence metric for the index value, the confidence metric representing a degree of correlation between the SS channel estimates and the PBCH DMRS channel estimates, and
prioritizing the index values of the set based on the corresponding confidence metrics.

14. A wireless network comprising:
a base station configured to wirelessly transmit radio frequency (RF) signaling representing synchronization signal block (SSB) burst comprising a set of SSBs, each SSB associated with a different beam transmitted by the base station and having a corresponding index value representing a position of the SSB in the SSB burst; and
a user equipment configured to:
detect an SSB of the SSB burst; and
identify an index value of the SSB by iteratively performing a decoding process for a physical broadcast channel (PBCH) of the SSB, each performed iteration using a different index values selected from a prioritized ordering of a set of index values representing the positions of the SSBs in the SSB burst, wherein the user equipment is further configured to determine the prioritized ordering of the set of indexed values by:
for each index value of the set of index values representing SSB positions of SSBs in the SSB burst, determining a corresponding confidence metric representing a degree of correlation in both time and frequency domains of PBCH demodulation reference signal (DMRS) channel estimates generated using the index value and
prioritizing the index values of the set based on the corresponding confidence metrics to generate the prioritized ordering of index values.

15. The wireless network of claim 14, wherein the user equipment is further configured to initiate a random access process with the base station via a random access channel (RACH) using resource blocks associated with the identified index value for the SSB.

16. The wireless network of claim 14, wherein the user equipment is further configured to identify an iteration of the decoding process for the PBCH as providing the valid decoding based on a cyclical redundancy check (CRC) performed on a result of the iteration of the decoding process.

17. A wireless network comprising:
a base station configured to wirelessly transmit radio frequency (RF) signaling representing synchronization signal block (SSB) burst comprising a set of SSBs, each SSB associated with a different beam transmitted by the base station and having a corresponding index value representing a position of the SSB in the SSB burst; and
a user equipment configured to:
detect an SSB of the SSB burst; and
identify an index value of the SSB by iteratively performing a decoding process for a physical broadcast channel (PBCH) of the SSB, each performed iteration using a different index values selected from a prioritized ordering of a set of index values representing the positions of the SSBs in the SSB burst, wherein the user equipment is further configured to determine the prioritized ordering of the set of indexed values by:

for each index value of the set of index values representing SSB positions of SSBs in the SSB burst:
- determining an PBCH demodulation reference signal (DMRS) signal generated using the index value;
- equalizing the PBCH DMRS signal to generate an equalized signal, and
- determining a confidence metric for the index value based on an evaluation of the equalized signal and a quadrature phase shift keying (QPSK) constellation, and prioritizing the index values of the set based on the corresponding confidence metrics to generate the prioritized ordering of index values.

* * * * *